US012506361B2

(12) United States Patent
Shamsi

(10) Patent No.: US 12,506,361 B2
(45) Date of Patent: Dec. 23, 2025

(54) METHOD TO HARVEST ENERGY FROM NEIGHBORING NODES WITHIN A COMMUNICATIONS NETWORK

(71) Applicant: Silicon Laboratories Inc., Austin, TX (US)

(72) Inventor: Mustafa Murtaza Shamsi, Bharuch (IN)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 18/374,411

(22) Filed: Sep. 28, 2023

(65) Prior Publication Data

US 2025/0112495 A1 Apr. 3, 2025

(51) Int. Cl.
*H02J 50/00* (2016.01)
*H02J 50/20* (2016.01)

(52) U.S. Cl.
CPC ............ *H02J 50/001* (2020.01); *H02J 50/20* (2016.02)

(58) Field of Classification Search
CPC .......... H02J 50/00; H02J 50/001; H02J 50/20; H02J 50/80; H04W 72/00
See application file for complete search history.

(56) References Cited

U.S. PATENT DOCUMENTS

| 9,332,134 B2* | 5/2016 | Wänstedt ............... G06Q 50/10 |
| 9,949,642 B2 | 4/2018 | Love et al. | |
| 10,038,992 B1 | 7/2018 | Zalewski et al. | |
| 2010/0178919 A1* | 7/2010 | Deepak ................. H04W 48/16 |
| | | | 455/435.2 |
| 2011/0225073 A1* | 9/2011 | Won ........................ G06Q 50/06 |
| | | | 320/108 |
| 2011/0279096 A1 | 11/2011 | Sonntag | |
| 2012/0034954 A1 | 2/2012 | Tabe | |

(Continued)

OTHER PUBLICATIONS

Bluetooth Special Interest Group, Bluetooth® "Low Energy Controller," Specification of the Bluetooth® System, vol. 6, Covered Core Package Version: 5.4, Version Date Jan. 31, 2023, 437 pages.

(Continued)

*Primary Examiner* — Rexford N Barnie
*Assistant Examiner* — Joseph N Inge
(74) *Attorney, Agent, or Firm* — Zagorin Cave LLP

(57) ABSTRACT

A technique for incorporating energy harvesting into a wireless network (e.g., an IoT network) of communications devices (e.g., IoT nodes) enables the nodes to harvest energy from neighboring nodes within the wireless network. The technique configures each node to identify its own energy requirements, to configure a node to be an energy harvesting node that scans the network of nodes for available wireless charger nodes, and to configure the energy harvesting node to harvest energy from available wireless charger nodes. In an embodiment, the technique increases reliability, reduces system costs, and extends the lifespan of battery powered IoT nodes. The node determines its own energy requirements, discovers available wireless charger nodes within the IoT network, configures the node for a wireless charging session, and initiates a wireless charging session between the node and an available wireless charger node.

19 Claims, 9 Drawing Sheets

(56) References Cited

U.S. PATENT DOCUMENTS

| | | | | |
|---|---|---|---|---|
| 2013/0214615 A1* | 8/2013 | Taleb | ............ | H02J 50/10 |
| | | | | 307/104 |
| 2015/0194838 A1* | 7/2015 | Won | ............ | H02J 7/0069 |
| | | | | 320/108 |
| 2015/0380973 A1* | 12/2015 | Scheb | ............ | H02J 50/20 |
| | | | | 320/108 |
| 2017/0025857 A1* | 1/2017 | Matthews | ............ | H02J 50/80 |
| 2017/0271984 A1 | 9/2017 | Kohn et al. | | |
| 2020/0195056 A1* | 6/2020 | Rekstad | ............ | H02J 50/80 |
| 2020/0251936 A1* | 8/2020 | Smith | ............ | H02J 50/10 |
| 2022/0248432 A1* | 8/2022 | Balasubramanian | ... | H02J 50/20 |
| 2022/0352751 A1* | 11/2022 | Elshafie | ............ | H02J 50/23 |
| 2023/0052957 A1* | 2/2023 | Lee | ............ | H04W 4/80 |
| 2023/0246490 A1* | 8/2023 | Park | ............ | H02J 50/80 |
| | | | | 455/41.2 |
| 2023/0261528 A1 | 8/2023 | Park et al. | | |

OTHER PUBLICATIONS

Tran, Le-Giang et al., "RF Power Harvesting: A Review on Designing Methodologies and Applications," Micro and Nano Systems Letters, Feb. 28, 2017, 16 pages.

Tutuncuoglu, K., and Yener, A., "Cooperative Energy Harvesting Communications with Relaying and Energy Sharing," 2013 IEEE Information Theory Workshop (ITW), Sep. 9-13, 2013, 5 pages.

\* cited by examiner

METHOD TO HARVEST ENERGY FROM NEIGHBORING NODES WITHIN A COMMUNICATIONS NETWORK

BACKGROUND

Field of the Invention

This disclosure relates to communications systems in general, and more particularly to networks of wireless communications systems.

Description of the Related Art

In general, wireless communications devices are being deployed in high numbers in wireless networks, e.g., Internet of Things (IoT) systems. A typical IoT device is battery-operated, includes sensors, processing circuits, and software, and is capable of exchanging data with other devices and systems using a communications network. An IoT device may be inaccessible for periodic maintenance, e.g., to replace or charge a battery. In addition, periodic battery replacement can be detrimental to the environment. Therefore, rather than include a conventional battery, some IoT devices harvest energy to power the device using an ambient source of energy, e.g., solar, thermal, or kinetic energy. An energy harvesting system can reduce maintenance costs due to battery replacement and may increase the lifespan of an associated battery-powered device. However, the transient nature of the ambient source of energy reduces reliability of the IoT system. Accordingly, new techniques for powering IoT devices are desired.

SUMMARY OF EMBODIMENTS OF THE INVENTION

In at least one embodiment, a method for harvesting energy in a network of nodes includes selecting, by a first node of the network of nodes, a second node of the network of nodes for a wireless charging session with the first node based on availability of the second node to be configured as a wireless charger node. The method includes initiating the wireless charging session with the second node by the first node. The second node is configured as the wireless charger node and the first node is configured as an energy harvesting node.

In at least one embodiment, a network of wireless nodes includes a first node having a radio frequency transceiver configured to transmit and receive radio frequency signals and data processing circuitry operable to select a second node of the network of nodes for a wireless charging session with the first node using the radio frequency transceiver based on availability of the second node to be configured as a wireless charger node. The data processing circuitry is further operable to initiate the wireless charging session with the second node. The second node is configured as the wireless charger node and the first node is configured as an energy harvesting node.

In at least one embodiment, a method for harvesting energy in a network of nodes includes transmitting, by a first node in the network of nodes to a second node in the network of nodes, a charger identification packet indicating availability of the first node to serve as a wireless charger node and a transmit power of the first node.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A technique for incorporating energy harvesting into a wireless network (e.g., an IoT network) of communications devices (e.g., IoT nodes) enables the nodes to harvest energy from neighboring nodes within the wireless network. The technique configures each node to identify its own energy requirements, to configure a node to be an energy harvesting node that scans the network of nodes for available wireless charger nodes, and to configure the energy harvesting node to harvest energy from available wireless charger nodes. In an embodiment, the technique increases reliability, reduces system costs, and extends the lifespan of battery powered IoT nodes. The node determines its own energy requirements, discovers available wireless charger nodes within the IoT network, configures the node for a wireless charging session, and initiates a wireless charging session between the node and an available wireless charger node.

Figure 1:
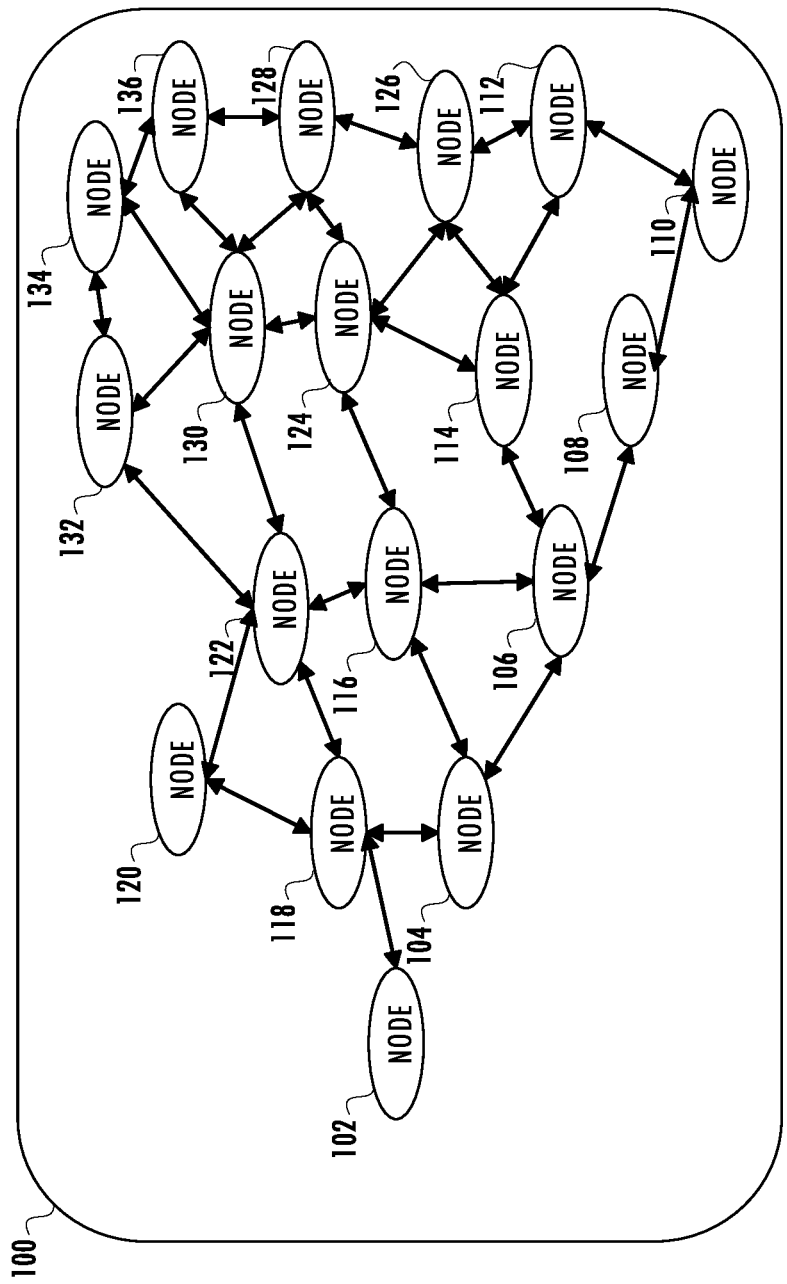
FIG. 1 illustrates a plurality of nodes communicatively coupled in a network.
Figure 2:
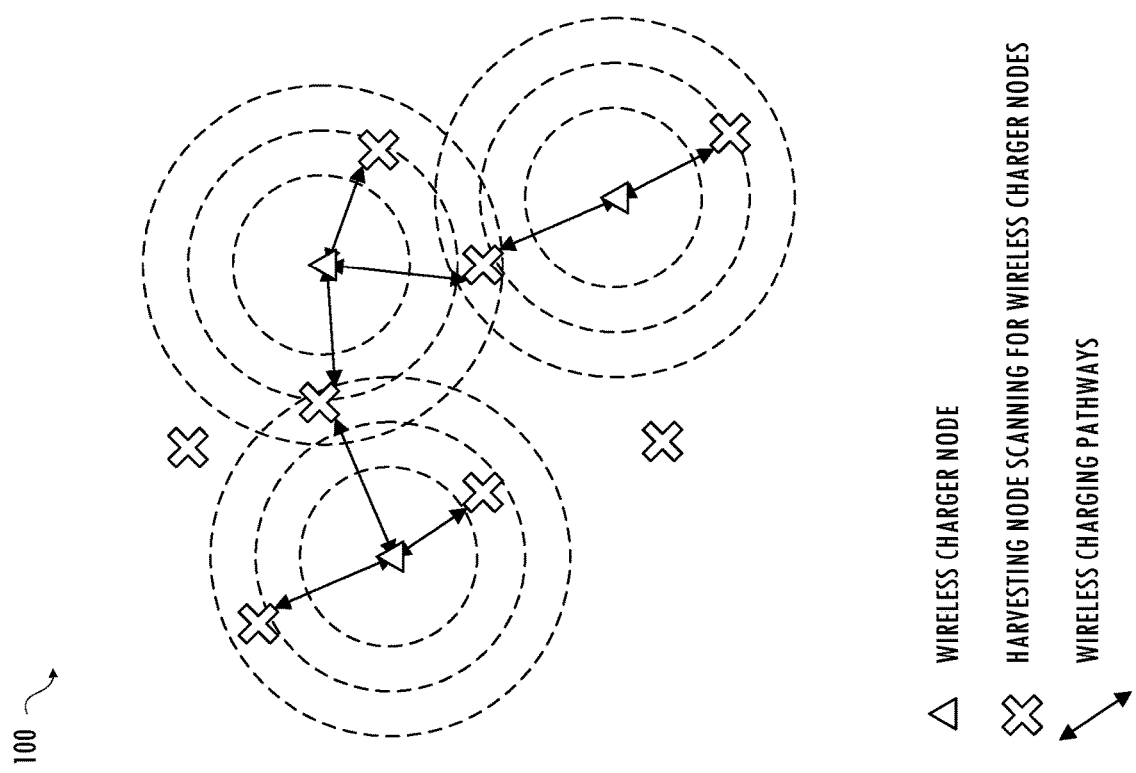
FIG. 2 illustrates a plurality of neighboring nodes configured as wireless charger nodes or wireless device scanning for wireless charger nodes consistent with at least one embodiment of the invention.

Referring to FIG. 1, in an embodiment, network 100 is an IoT network (e.g., a smart home IoT network) of IoT devices (e.g., nodes 102, 104, 106, ..., 136). Each node has its own energy budget. A subset of those nodes (e.g., electric meter, communications router, or solar-powered LED lamps) have wired connections to a power source and can be configured as charger devices that provide power to another subset of one or more nodes that are battery-powered (e.g., smart cameras, doorknobs, or smart watches) and may use energy harvesting. For example, FIG. 2 illustrates how a node configured as an energy harvesting node can pair with another node in the network configured as a wireless charger node to harvest energy from the wireless charger node using wireless charging pathways.

Figure 3:
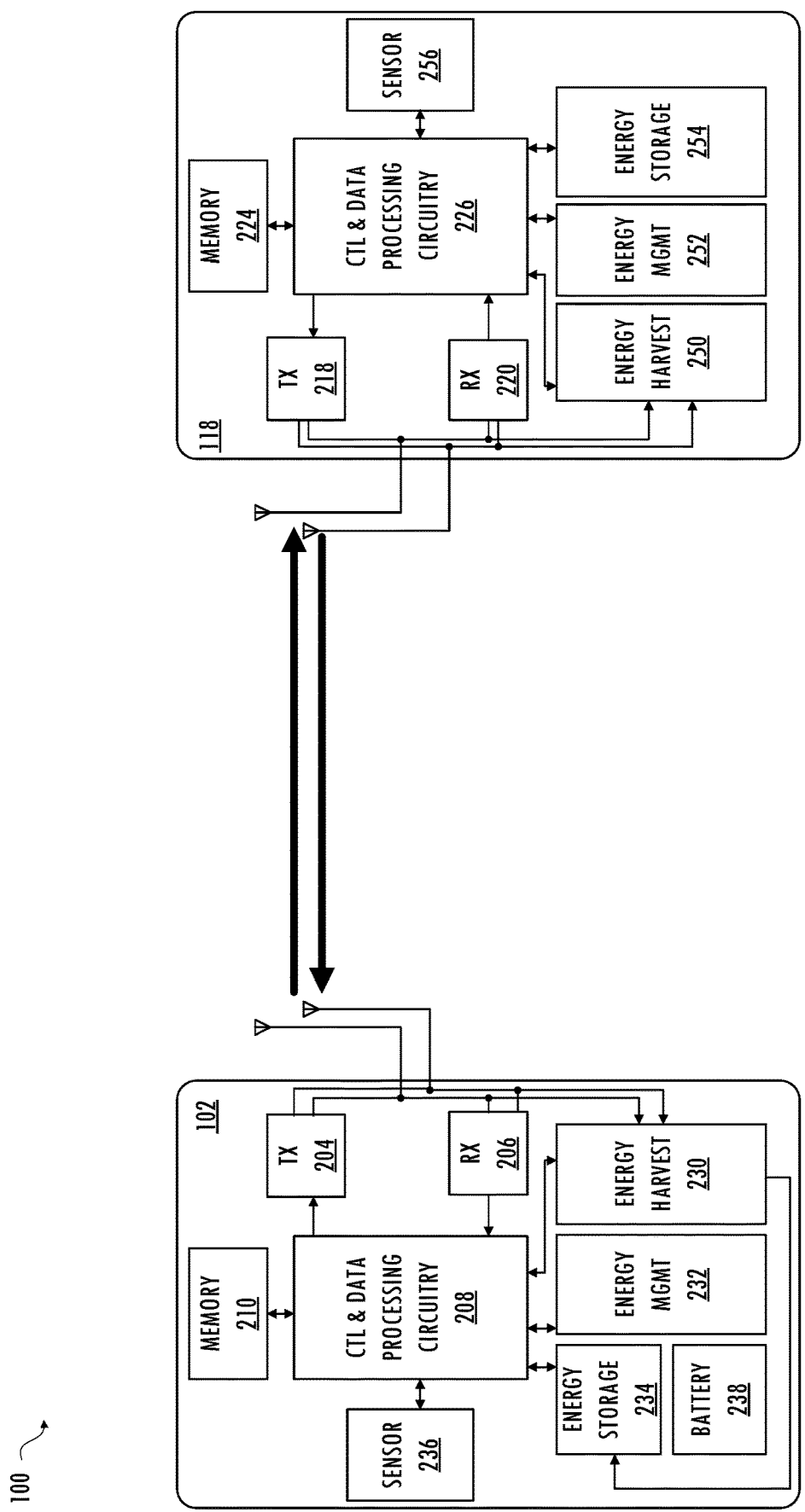
FIG. 3 illustrates a functional block diagram of exemplary nodes of the network of FIG. 1.

Referring to FIG. 3, in at least one embodiment, network 100 includes node 102 and node 118, which include wireless communications interfaces compliant with the Bluetooth® Low Energy (BLE) communications protocol or the BLE High Data Throughput (BLE HDT) communications protocol designed for low power and low latency applications. Node 102 includes transmitter 204, receiver 206, control & data processing circuitry 208, and memory 210. Node 118 includes transmitter 218, receiver 220, control & data processing circuitry 226, and memory 224. Although node 102 and node 118 are illustrated as each including only one transmitter, one receiver, and two antennas, in other embodiments of network 100, node 102 or node 118 includes multiple transmitters, multiple receivers, additional antennas, or a single antenna with internal circuitry selection or radio frequency switches. Network 100 can communicate information using a predetermined wireless communications protocol, e.g., data using BLE communications protocol or BLE HDT communications protocol. However, in other embodiments, network 100 can transmit and receive data compliant with other wireless communications protocols.

In an embodiment of network 100, node 102 is configured as an energy harvesting node and node 118 is configured as a wireless charger node. In an embodiment, node 102 includes sensor 236, energy harvesting circuit 230, energy management unit 232, energy storage 234, and battery 238, and node 118 includes sensor 256, energy harvesting circuit 250, energy management unit 252, and energy storage 254. In at least one embodiment, sensor 256 includes an application-specific sensor, e.g., a sensor to monitor ambient light in a smart light-emitting diode (LED) application or a passive infrared sensor (PIR) in a smart camera application. In at least one embodiment, energy harvesting circuit 230 includes an impedance matching circuit (e.g., an L, T, or Pi network) and a rectifying circuitry (e.g., half-wave, full-wave, or bridge RF-DC rectifying circuit) that converts RF radiation into electrical energy and has gain, RF-DC power conversion efficiency, a number of stages, rectifier configuration, and sensitivity suitable for a target IoT application. Energy harvesting circuit 230 is configured to harvest energy from packets wirelessly received from a discovered wireless charger node and stores that energy in energy storage 234. In an embodiment, energy storage 234 is a rechargeable battery or super capacitor.

In an embodiment, energy management unit 232 includes a combination of hardware and software that determines a power budget of node 102 and manages the energy harvesting operations of node 102 based on that power budget. In an embodiment, energy management unit 232 measures the energy level of battery 238, forecasts energy requirements of node 102, interfaces with energy harvesting circuit 230, and determines the current energy level of node 102. In some embodiments, energy management unit 232 implements energy harvesting models that predict the amount of energy that needs to be harvested, thereby improving estimates of system energy requirements. In at least one embodiment, energy management unit 232 estimates an energy consumption of scanning and initiating a wireless charging session and proceeds to scan and initiate energy harvesting if the estimate is less than an estimated amount of energy to be harvested and if an estimate of associated scanning and energy harvesting traffic does not exceed a threshold for network congestion that substantially impacts data transmission. In at least one embodiment, energy management unit 232 incorporates other functions (e.g., functions described with reference to energy management unit 252).

In at least one embodiment, node 118 is line powered. In other embodiments, rather than being line-powered, node 118 is battery powered and includes energy storage circuit 254. When node 118 is configured as an energy harvesting node, energy harvesting circuit 250 harvests energy from a discovered energy charger and stores that energy in energy storage 254. Energy management unit 252 determines the power budget of node 118 and availability as a wireless charger node. In an embodiment, energy management unit 252 includes hardware and software that monitors the energy usage of node 118 and the strength of the associated energy source (e.g., power-supply node coupled to a battery or other power source). Energy management unit 252 determines whether node 118 can serve as a wireless charger node. For example, if node 118 is line-powered, it is considered to have an infinite source of energy as compared to a battery-powered device and can serve as a wireless charger. If node 118 is battery-powered or relies on another source of energy, energy management unit 252 determines whether a stored energy level is sufficient for sharing energy with other nodes. Energy management unit 252 also determines the time periods during which node 118 can serve as a wireless charger. For example, a line-powered device could serve as a wireless charger at any time. In contrast, a solar powered LED lamp could serve as a wireless charger only during its active charging period, e.g., during daylight hours.

In addition, energy management unit 252 determines whether node 118 initiates a scan to identify nodes in the network from which energy can be harvested. For example, if node 118 has stored energy that is less than a predetermined threshold amount of energy, it may benefit from harvesting energy from a neighboring wireless charger node to avoid system shutdown. In an embodiment, energy management unit 252 calculates an energy budget for node 118 based on an average energy consumption per task, average energy consumption per unit time, or other metric for node 118, to determine an amount of energy the node, configured as an energy harvesting node, should harvest from a wireless charger node within the network or an amount of excess stored energy that the node, configured as a wireless charger node, can transfer to another node within the network. In at least one embodiment, energy management unit 252 incorporates other functions (e.g., functions described with reference to energy management unit 232).

Figure 4:
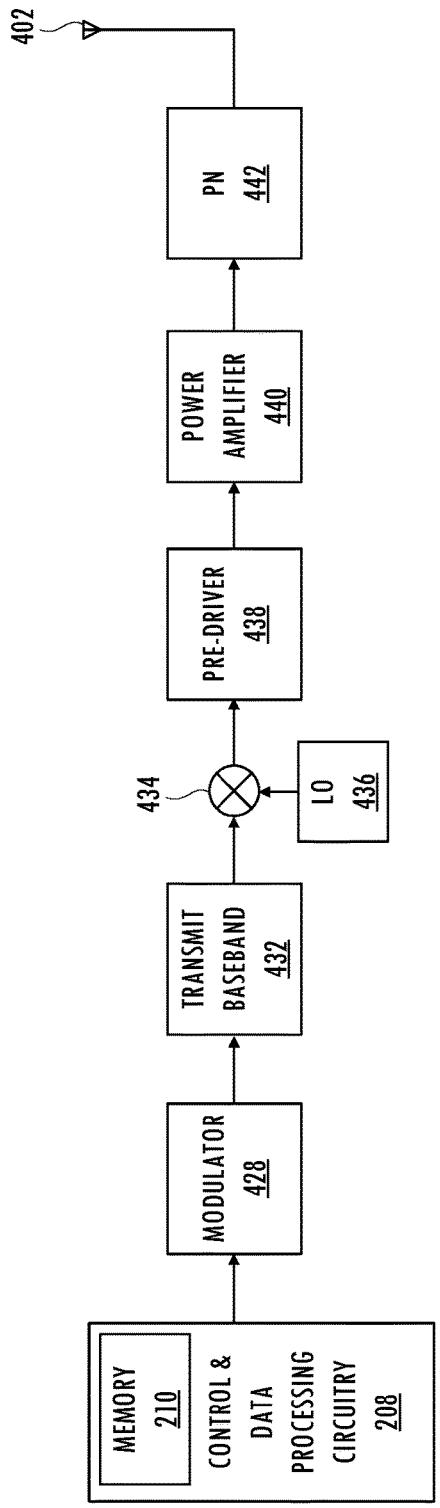
FIG. 4 illustrates a functional block diagram of an exemplary wireless communications transmitter of a node of FIG. 3.

FIG. 4 illustrates an exemplary embodiment of transmitter 204 that may be included in a physical radio of node 102 or node 118 of FIG. 3. Control & data processing circuitry 208 of FIG. 4 may perform a variety of functions (e.g., logic, arithmetic, etc.). For example, data processing circuitry 208 executes a program, routine, or algorithm (whether in software, firmware, hardware, or a combination thereof) that performs desired control or data processing tasks consistent with a physical layer of a communications protocol and provides data to modulator 428. Modulator 428 applies a predetermined modulation scheme (e.g., phase-shift keying or quadrature amplitude modulation) to data for transmission and provides modulated data to transmit baseband circuit 432, which in an embodiment includes a digital-to-analog converter and analog programmable gain filters. Transmit baseband circuit 432 provides the baseband (or intermediate frequency (IF)) signal to frequency mixer 434, which performs frequency translation or shifting of the baseband signal using a reference or local oscillator (LO) signal provided by local oscillator 436. In at least one operational mode of transmitter 204, frequency mixer 434 translates the baseband signal centered at DC to a 2.4 GHz frequency band. Pre-driver 438 amplifies the signal generated by frequency mixer 434 to a level sufficient for power amplifier 440. Power amplifier 440 further amplifies the signal to provide a higher power signal sufficient to drive passive network 442 and antenna 402, which has a suitable gain and resonance frequency. Passive network 442 provides impedance matching, filtering, and electrostatic discharge protection with suitable Q factor, resonance frequency, and bandwidth.

Figure 5:
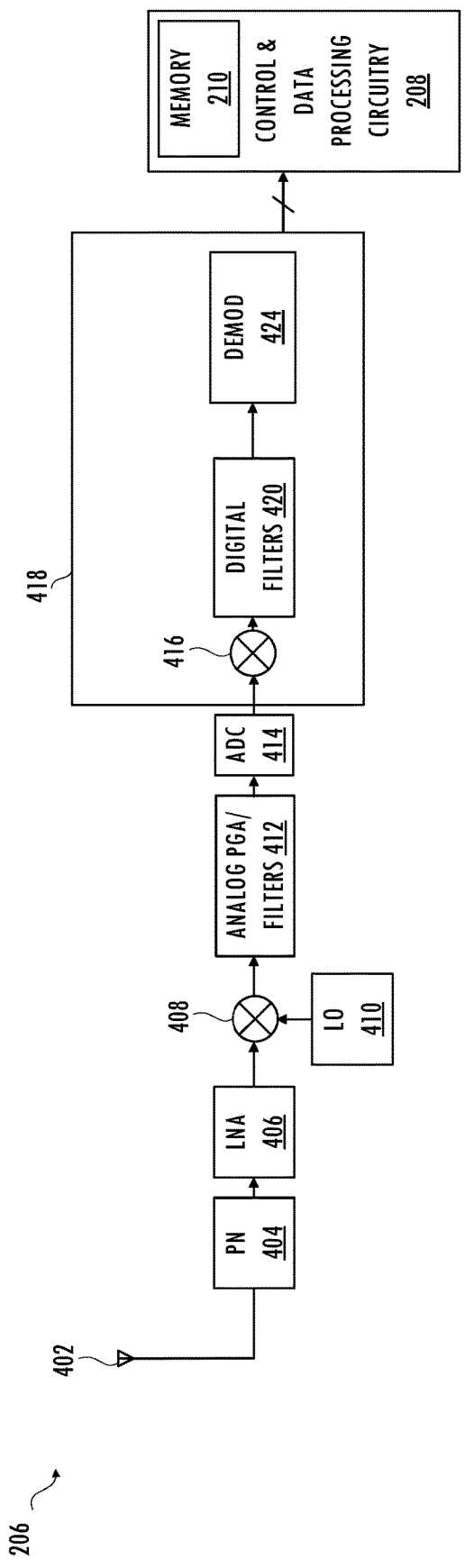
FIG. 5 illustrates a functional block diagram of an exemplary wireless communications receiver of a node of FIG. 3.

FIG. 5 illustrates an exemplary embodiment of receiver 206 that may be included in a radio of the wireless communications devices described above. Antenna 402 provides a radio frequency (RF) signal to passive network 404, which provides impedance matching, filtering, and electrostatic discharge protection. Passive network 404 is coupled to low-noise amplifier 406, which amplifies the RF signal without substantial degradation to the signal-to-noise ratio and provides the amplified RF signal to frequency mixer 408. Frequency mixer 408 performs frequency translation or shifting of the RF signal using a reference or local oscillator signal provided by local oscillator 410. For example, in at least one operational mode of receiver 206, frequency mixer 408 translates the RF signal from a 2.4 GHz frequency band to baseband frequencies centered at DC (i.e., zero-intermediate frequency (ZIF) in a ZIF mode of operation). In another operational mode, receiver 206 is configured as a low-intermediate frequency (LIF) receiver (i.e., in a LIF mode of operation) and frequency mixer 408 translates the RF signal to a low-intermediate frequency (e.g., 100-200 kHz) to reduce or eliminate DC offset and 1/f noise problems of ZIF receivers.

Frequency mixer 408 provides the translated output signal as a set of two signals, an in-phase (I) signal and a quadrature (Q) signal. The I and Q signals are analog time-domain signals. In at least one embodiment of receiver 206, the analog programmable gain amplifier and filters 412 provide amplified and filtered versions of the I and Q signals to analog-to-digital converter (ADC) 414, which converts those versions of the I and Q signals to digital I and Q signals (i.e., I and Q samples). Exemplary embodiments of ADC 414 use a variety of signal conversion techniques (e.g., delta-sigma (i.e., sigma-delta) analog-to-digital conversion). ADC 414 provides the digital I and Q signals to signal processing circuitry 418. In general, signal processing circuitry 418 performs digital signal processing (e.g., frequency translation (e.g., using digital mixer 416), filtering (e.g., using digital filters 420), demodulation, or signal correction) of the digital I and Q signals. In at least one embodiment, signal processing circuitry 418 includes demodulator 424, which recovers or extracts information from digital I and Q signals (e.g., data signals, that were modulated using phase-shift keying or quadrature amplitude modulation by modulator 428 of transmitter 204 of FIG. 4 and provided to antenna 402 as RF signals).

Referring back to FIG. 5, control & data processing circuitry 208 may perform a variety of functions (e.g., logic, arithmetic, etc.). For example, control & data processing circuitry 208 may use the demodulated data in a program, routine, or algorithm (whether in software, firmware, hardware, or a combination thereof) to perform desired control or data processing tasks. In at least one embodiment, control & data processing circuitry 208, which includes memory 210, controls other circuitry, sub-system, or systems (not shown). In an embodiment, control & data processing circuitry 208 implements a data link layer that includes a state machine, defines state transitions, defines packet formats, performs scheduling, performs radio control, and provides link-layer decryption consistent with at least one wireless communications protocol. Transmitter 204 of FIG. 4 and receiver 206 of FIG. 5 are illustrative only and may vary with the communications protocol implemented by network 100 of FIG. 1.

Figure 6A:
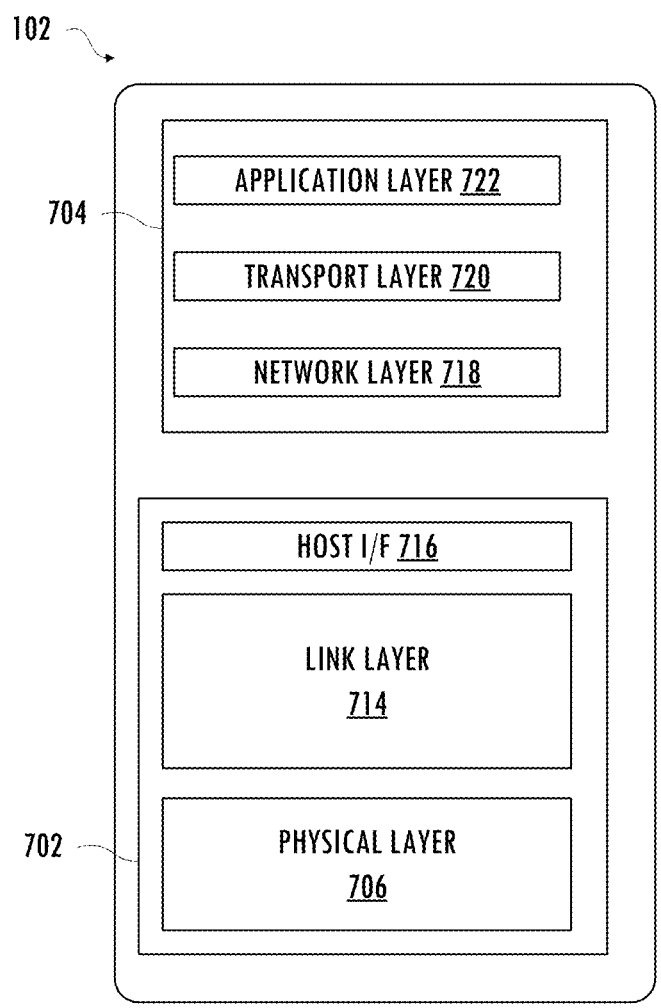
FIG. 6A illustrates a functional block diagram of a protocol stack executing on a node of FIG. 3.

Referring to FIGS. 3 and 6A, in an embodiment, node 102 includes separate integrated circuits for implementing functions of control & data processing circuitry 208, e.g., controller 702 and host 704. In some embodiments, node 102 incorporates functionality of controller 702 and host 704 in a single integrated circuit device. Controller 702 and host 704 execute instructions to implement portions of a wireless communications network protocol stack. For example, controller 702 implements physical layer 706, which includes software that interacts with the RF transceiver (e.g., including the transmitter and receiver described above). Link layer 714 interfaces directly to physical layer 706 to handle transmission and reception of associated signals. In at least one embodiment, link layer 714 of controller 702 communicates with host 704 via host interface 716. Host 704 implements upper layers of the communications protocol stack (e.g., network layer 718, transport layer 720, and application layer 722). In other embodiments, the layers of the software protocol stack have different distributions between controller 702 and host 704 or are completely implemented using controller 702.

Figure 6B:
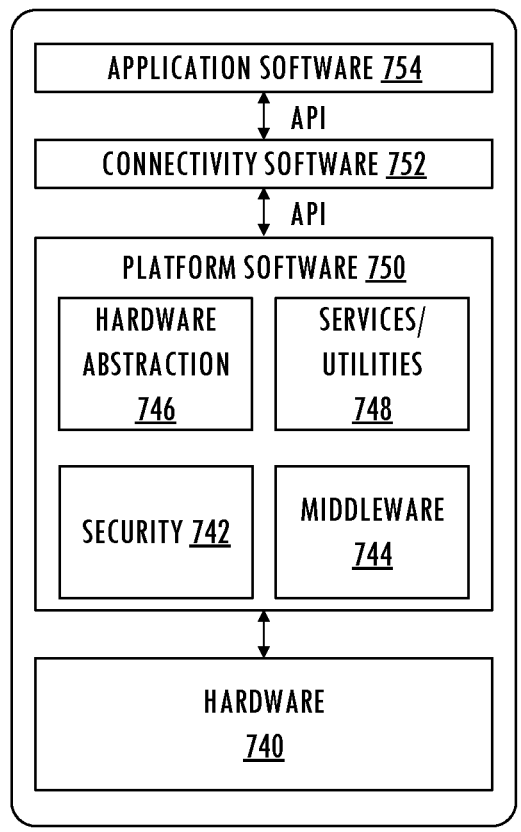
FIG. 6B illustrates a functional block diagram of an embedded software stack executing on a node of FIG. 3.

Referring to FIG. 6B, in some embodiments, an energy harvesting system of node 102 includes hardware 740 and embedded software. For example, hardware 740 includes a processor, memory wireless radio, a radio frequency energy harvesting circuit, energy management circuit, energy storage, I/O, etc. Platform software 750 includes security 742, middleware 744, hardware abstraction layer 746 (e.g., register interfaces, device drivers, real-time operating system), and services and utilities 748 (e.g., timers, wireless charger discovery protocol, energy management unit, and energy harvesting scheduler). Platform software 750 communicates with connectivity software 752 and application software 754 using Application Programming Interfaces (APIs).

Figure 7:
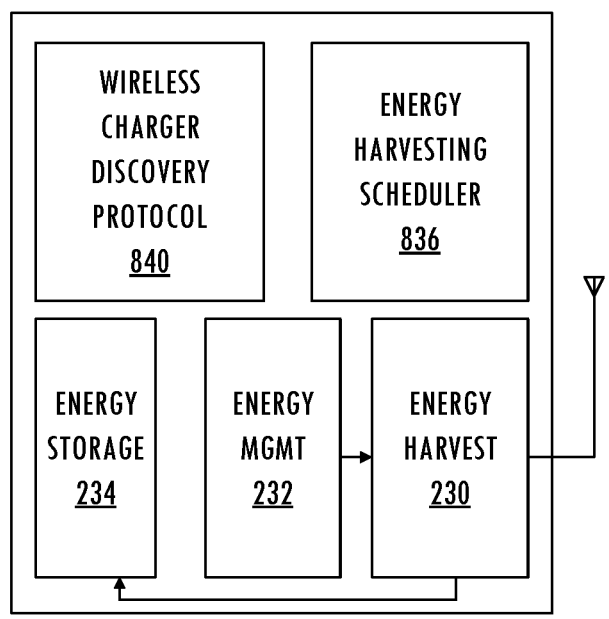
FIG. 7 illustrates a functional block diagram of components of a node of FIG. 3.

Referring to FIGS. 6B and 7, in an embodiment, energy harvesting scheduler 836 (e.g., implemented in platform software 750) schedules wireless charging sessions when multiple wireless charger nodes are available in a network. Energy harvesting scheduler 836 receives inputs from energy management unit 232 based on requirements of node 102, or it receives inputs directly from application software 754 for energy-aware applications to schedule wireless charging sessions. Energy harvesting scheduler 836 is aware of available energy charger nodes and associated availability schedules. Energy harvesting scheduler 836 has sole control of scheduling the wireless charging sessions to meet energy requirements of node 102. In at least one embodiment, application software 754 need not be modified to support energy harvesting techniques described herein. Rather the energy harvesting techniques described herein are implemented as a platform service (e.g., using an embedded software stack or platform software 750 of the IoT node), with the application being unaware of the wireless charging service.

In an embodiment, the platform software 750 of an IoT node is a layer of software in the software stack that provides the capability for the node to discover and initiate a wireless charging session and encapsulates finer details from the application layer. However, advanced users may tailor the wireless charging service and include variations to application software 754 accordingly, per application requirements. For example, a BLE-based application ensures that node 102 has sufficient energy to support an upcoming transmission of a BLE beacon. Prior to transmitting the BLE beacon, node 102 uses the energy harvesting techniques described herein to replenish the energy level of node 102, if appropriate, before proceeding to transmit a BLE beacon packet. Such service may be configurable using an API. An exemplary platform layer includes at least one API that interacts with the hardware but is separate from any user application. In other embodiments, a user application provides the option to enable or disable a wireless charging session feature. In an embodiment, a platform layer interacts with physical layer 706. In embodiments that include a host and a controller, the host and controller include corresponding platform layers.

In an embodiment, energy harvesting scheduler 836 (e.g., implemented in platform software 750) schedules a scanning session. In an embodiment, node 102 does not need a lengthy list of charger devices within the network and energy harvesting scheduler 836 initiates scanning the network only when the number of identified chargers falls below a predetermined number. In another embodiment, node 102 computes a target harvested energy and creates a list of available wireless charger nodes that can deliver the targeted harvested energy. In another embodiment, node 102 prioritizes line-powered charger devices over other types of charger devices since line powered devices have more reliable availability. Hence, a scanning session may terminate in response to the discovery of a line-powered charger device. A reduction in the time node 102 spends scanning reduces overhead and energy cost.

In an embodiment, wireless charger discovery protocol 840 initiates on-demand wireless charging sessions with one or more registered wireless charger node. In at least one embodiment, node 102 is configured as an energy harvesting node that receives energy over the wireless network. Node 102 initiates wireless charger discovery protocol 840 and a neighboring node that can serve as the wireless charger node responds with an identification packet. The periodicity of scanning for nodes can be selected for low power consumption and may be tuned according to the energy budget of a corresponding node.

In at least one embodiment, all nodes within the network are classified as a line-powered device (e.g., routers, electric meters, LED lamps) or a battery-powered device (e.g., home automation devices, smart cameras/doorbells/doorknobs, wearables, etc.). In other embodiments, nodes are classified according to a corresponding energy budget. For example, an exemplary class 1 device has a limitless energy supply (e.g., line-powered) and can be configured as wireless charger nodes for energy harvesting. A class 2 node is an energy-constrained node (e.g., battery-powered) that harvests energy from a class 1 or class 3 node. A class 3 node is partially energy-constrained, e.g., battery-powered, but capable of intermittently providing energy as a wireless charger node. For example, a solar-powered LED lamp serves as a wireless charger during daylight and transitions to a class 2 node during nighttime. In at least one embodiment, a node monitors its energy consumption pattern to predict future energy requirements and periodically transitions between different device modes.

In at least one embodiment, wireless charger discovery protocol 840 includes multiple phases. A scanning phase is initiated by a node, e.g., in response to energy management unit 232 detecting a need for harvesting energy. In an embodiment, node 102 broadcasts a predetermined packet (e.g., a charger discovery packet) that triggers neighboring nodes in the network that can serve as a wireless charger to respond by transmitting a charger identification packet. The initiating node receives and records the charger identification packet and associated device in a charger registration phase. In another embodiment, a wireless charger node periodically broadcasts a corresponding charger identification packet that is recorded by a neighboring node during a scanning phase. Although, under some circumstances, periodic broadcasting is energy efficient for an energy-constrained node, it may be wasteful if no node is scanning the network at a time of the message broadcast. Additionally, the periodic broadcasting technique increases network traffic and interferes with data transmission of other devices.

In an embodiment, in response to receiving a charger identification packet, an energy harvesting node enters a charger registration phase to communicate to a wireless charger node the intent of the energy harvesting node to harvest energy from the wireless charger node. If the wireless charger node is previously unknown to the energy harvesting node, then the energy harvesting node initiates the charger registration process. In addition, the wireless charger node and the energy harvesting node negotiate the availability of the wireless charger node.

In the final phase of the charger discovery, the wireless charger node communicates a configuration. The energy harvesting node either accepts the configuration from the wireless charger node and adds a new entry in a list of available charger nodes or decides to not proceed with the newly discovered charger node. Successful registration of at least one charger node with the energy harvesting node is required for the energy harvesting node to trigger any future wireless charging sessions.

In at least one embodiment, if a wireless charger node is no longer available in the network, the wireless charger node broadcasts its unavailability. However, an energy harvesting node may not necessarily receive that information. Hence, at the next attempt to initiate a wireless charging session, the energy harvesting node fails to receive any response from the wireless charger node and the energy harvesting node automatically removes that charger node from the list of registered wireless charger nodes. In another implementation of interconnected nodes, an energy charger node broadcasts unavailability that is recorded by a neighboring node, which later passes on the unavailability information to the energy harvesting node. The energy harvesting node does not attempt to initiate a wireless charging session with the unavailable charger node, thereby conserving energy at the energy harvesting node.

In a shared and open network, it is possible that a malicious device can project itself as a wireless charger node allowing an entry to an energy harvesting node. Hence, in an embodiment, the charger registration process validates the identity of a wireless charger node. For example, the energy harvesting node validates a predetermined vendor-specific identifier communicated in a wireless charger node identification packet or a handshaking protocol between a wireless charger node and an energy harvesting node is used to authenticate each other.

In an embodiment, after wireless charger node discovery and wireless charger node registration, an energy harvesting node initiates a wireless charging session, e.g., a pre-configured periodic session that includes a wireless charger node initiating an energy wireless charging session according to a schedule determined based on factors described below. In other embodiments, the energy harvesting node initiates the wireless charging session on-demand by sending a charging initiation request to an available wireless charger node already registered with the energy harvesting node. In both embodiments, if multiple charger nodes have been configured, the energy harvesting node selects a wireless charger node as described further below.

When configured as an energy harvesting node, the amount of energy node 102 harvests from a wireless charger node has the following relationship:

$$E_G = P_R \times A_E \times R_E \times S_E,$$

where $E_G$ is energy generated per unit time, $P_R$ is received power, $A_E$ is antenna efficiency, $R_E$ is DC-DC rectifier efficiency, and $S_E$ is energy storage media efficiency of energy storage 234. A relationship between received power $P_R$ at a receiving node and transmit power $P_T$ at the transmitting node is described according to the Friis transmission equation as follows:

$$P_R = \left[\frac{P_T \times G_T \times G_R \times \lambda^2}{(4 \times \pi \times d)^2}\right],$$

where $G_R$ is the receiver gain, $G_T$ is the transmitter gain, $\lambda$ is the wavelength, and d is the distance between the transmitting node and the receiving node. Total energy harvested by node 102 when configured as an energy harvesting node over a predetermined period is:

$$E_{TOTAL} = E_G \times t,$$

where t is the total duration of a harvesting interval. The amount of energy harvested varies with the efficiency of the rectifying antenna, efficiency of any DC-DC converter circuit and storage media, received signal strength, total duration of harvesting time, or other factors. An exemplary energy harvesting protocol estimates $E_G$ for each registered energy charger node and uses this information in an attempt to maximize the amount of energy harvested and attempts to minimize the amount of energy lost during a harvesting interval. An increase in the efficiency of the energy harvesting protocol results in an increase in efficiency of an associated IoT network (e.g., the wireless charger could power a greater number of nodes or could power a node for a longer period). Efficiency varies with node-specific factors (e.g., rectifying antenna efficiency, charge storage media efficiency, and other factors) and remains constant across all wireless charging sessions.

For example, if there are two wireless charger nodes situated at different distances from an energy harvesting node, the two wireless charger nodes will be associated with different received signal strengths at the energy harvesting node for the same transmit power. In another scenario, two wireless charger nodes situated at different distances from an energy harvesting node may have the same received signal strength at the energy harvesting node but different transmit power levels. In another scenario, two wireless charger nodes situated at the same distance from the node may exhibit different received signal strengths at the energy harvesting node due to variations in the corresponding surrounding environmental conditions. In at least one embodiment, neighboring nodes estimate the distances between each other using conventional high-accuracy distance measurement techniques.

In general, the received signal strength at an energy harvesting node and the transmit power level at a wireless charger node are indicators used to generate an estimate of channel attenuation between the energy harvesting node and a wireless charger node. In an embodiment, energy harvesting scheduler 836 considers channel attenuation while selecting a wireless charger for wireless charging session with an energy harvesting node. The channel attenuation, which is based on the distance between the transmitting node and receiving node, may be determined by measuring a ratio between transmitted power and received power, where the received power is determined at the receiving node and the transmitted power is communicated as part of a payload transmitted at the time of configuring the wireless charger node. The transmitted power information can be used to schedule wireless charging using wireless charging nodes that have relatively similar receiver signal strengths. Other factors for consideration include charger availability, amount of energy harvested per unit time $E_G$, etc. Although multiple other factors could be used by an energy harvesting node to choose and trigger a wireless charging session with an available wireless charger node, an exemplary scheme to initiate a wireless charging session includes obtaining a list of available wireless charger nodes within a network. In an embodiment, if the number of available chargers $C_{COUNT}$ equals one, an energy harvesting node initiates a wireless charging session, and if the number of available chargers $C_{COUNT}$ is greater than one, then the energy harvesting scheduler 836 selects a wireless charger node based on the charger node with the greatest amount of energy harvested per unit time $E_G$, or other factor, and initiates a wireless charging session with the selected wireless charger node.

In at least one embodiment, energy harvesting scheduler 836 of an energy harvesting node selects an available wireless charger node and schedules a wireless charging session with the available wireless charger node. As the number of wireless charger nodes available for wireless charging session with the node changes throughout the day or other interval in response to changing physical parameters and to meet the energy requirements of the node, energy harvesting scheduler 836 changes the selected energy harvesting node. In general, energy harvesting scheduler 836 has N inputs and one output. The output of energy harvesting scheduler 836 is a wireless charger ID (i.e., one of the IDs known to the energy harvesting node) that is used when initiating a wireless charging session with a wireless charger node. The inputs to energy harvesting scheduler 836 include (are not limited to) device parameters (e.g., rectifying antenna efficiency, storage media efficiency, etc.), target harvest energy from the energy unit, system availability for energy harvesting (wireless subsystem), etc. Other embodiments have additional inputs and outputs used to increase the intelligence of energy harvesting scheduler 836. However, increased intelligence may increase power consumption and memory requirements.

In at least one embodiment, energy harvesting scheduler 836 maintains a data structure (e.g., list or table) of registered wireless charger nodes (e.g., wireless charger nodes identified by a unique charger ID) and associated parameters (e.g., availability or estimated energy harvested from the wireless charger node). Energy harvesting scheduler 836 accesses this data structure and the associated metadata for each wireless charger node and uses this information and requirements of the energy harvesting node to determine a list of available charger nodes for each timeslot. In at least one embodiment, energy harvesting scheduler 836 partitions a 24-hour day into multiple timeslots with a predetermined interval or an interval dynamically determined according to node operation. In an embodiment, energy harvesting scheduler 836 maintains a scheduling data structure including entries corresponding to each timeslot. Each entry is associated with a charger list (e.g., list $C_A$, list $C_B$, list $C_C$) including one or more of wireless charger nodes that are available for that timeslot.

TABLE 1

Scheduling Data Structure

| Timeslot | Charger List |
|---|---|
| A | $C_A$ |
| B | $C_B$ |
| C | $C_C$ |

Energy harvesting scheduler 836 maintains a data structure having entries for each wireless charger node in a charger list, including a charger ID, a start time within the timeslot assigned by the scheduler, an end time within the timeslot assigned by the scheduler, estimated harvested energy, etc.

TABLE 2

Wireless Charger Node List for Timeslot A

| Charger ID | Start Time | End Time | Estimated Harvested Energy |
|---|---|---|---|
| $ID_1$ | $T_{S1}$ | $T_{E1}$ | $E_{G1}$ |
| $ID_2$ | $T_{S2}$ | $T_{E2}$ | $E_{G2}$ |
| $ID_3$ | $T_{S3}$ | $T_{E3}$ | $E_{G3}$ |

The estimated harvested energy $E_{Gn}$ is calculated as:

$$E_{Gn} = P_R \times A_E \times R_E \times S_E,$$

which is further described above. In an embodiment, energy harvesting scheduler 836 uses system requirements for the energy harvesting node to make a rule-based decision. In at least one embodiment, complex decision-making rules are used, e.g., ranking the available wireless charger nodes using weighting factors. In an embodiment, energy harvesting scheduler 836 dynamically ranks available wireless charger nodes to account for external variations. If no wireless charger nodes are available within a timeslot, energy harvesting scheduler 836 enters a NULL pointer or other indicator for the charger list for that timeslot. Alternatively, only timeslots containing at least one available wireless charger node are maintained in the data structure to reduce the amount of memory consumed by the table. The scheduling techniques and data structures described with reference to Tables 1 and 2 are exemplary only and other scheduling techniques may be used.

In at least one embodiment, a first wireless charger node, which is selected for timeslot A is not the same as a second wireless charger node, which is selected for timeslot B. Energy harvesting scheduler 836 may update the wireless charger node selected for energy harvesting across timeslots and energy harvesting scheduler 836 updates its output accordingly. A change in selection may occur due to unscheduled downtime of a wireless charger node, discovery of a new wireless charger node, a change in the energy requirements of the system, or other circumstance.

Figure 8:
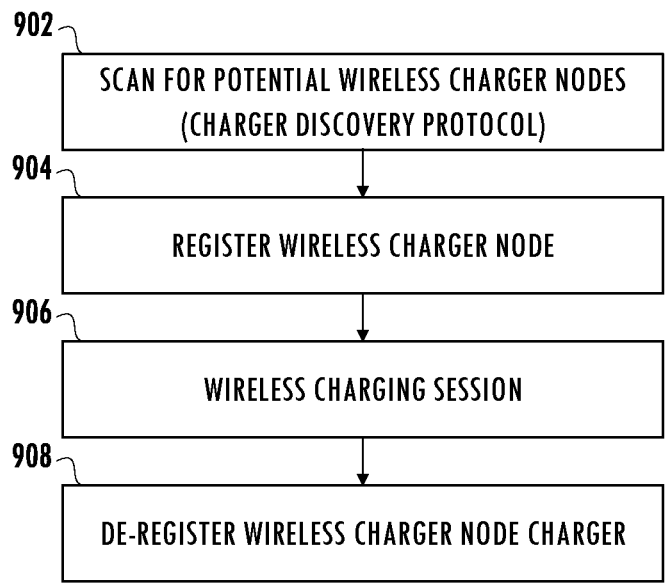
FIG. 8 illustrates an information and control flow for an exemplary wireless charging session consistent with at least one embodiment of the invention.
Figure 10:
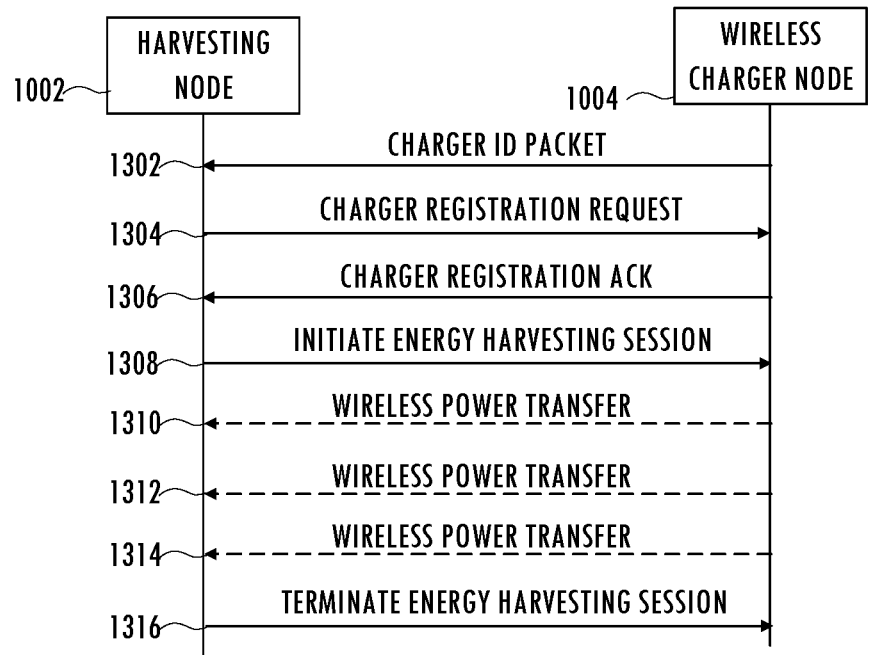
FIG. 10 illustrates exemplary communications between nodes of a communication network during a wireless charging session consistent with at least one embodiment of the invention.
Figure 9:
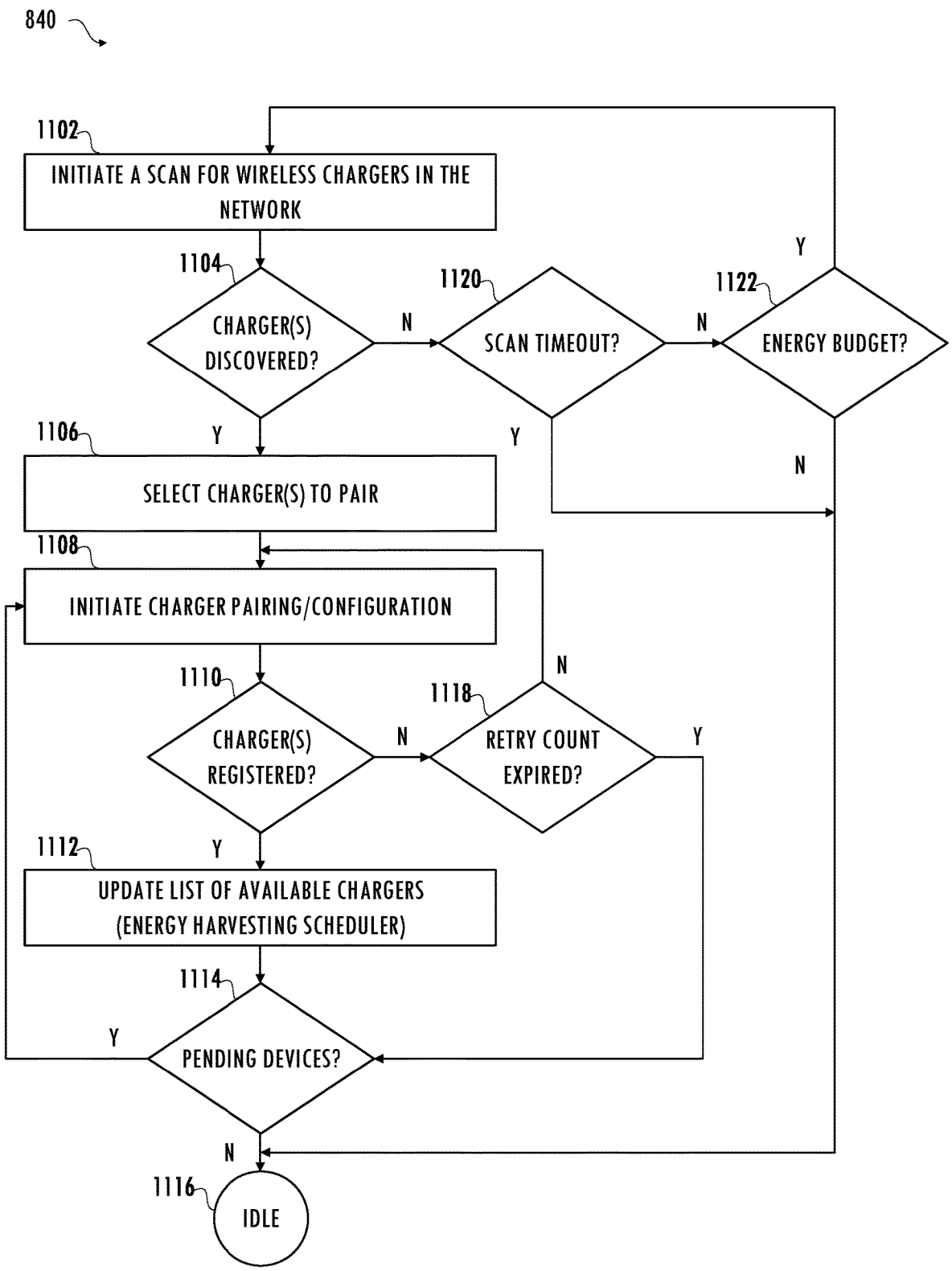
FIG. 9 illustrates a detailed information and control flow for an exemplary charger discovery protocol consistent with at least one embodiment of the invention.

Referring to FIGS. 6B, 7, and 8, in at least one embodiment, node 102 implements wireless charger discovery protocol 840, in which node 102 searches for, discovers, and registers other nodes in the network that may serve as a wireless charger node. In at least one embodiment, wireless charger discovery protocol 840 causes node 102 to scan for available wireless charger nodes in the network (902). After detecting at least one wireless charger node in the network, node 102 registers at least one wireless charger node (904). After registering at least one wireless charger node in the network, node 102 engages in a wireless charging session (906) including receiving one or more wireless power transfer packet. After the wireless charging session is complete, node 102 de-registers the wireless charger node (908).

Referring to FIGS. 6B, 7, 8, and 9, in at least one embodiment, wireless charger discovery protocol 840 initiates a scan for available wireless chargers in a communications network (1102) and node 102 determines whether one or more available wireless charger nodes are discovered (1104). If node 102 does not discover any available wireless charger nodes in the network, then node 102 determines whether a predetermined scan period has expired (1120). If the predetermined scan period has expired, then node 102 enters an idle state of wireless charger discovery protocol 840 (1116). If the predetermined scan period has not expired, then node 102 determines whether the energy budget of node 102 allows for additional scanning (1122). If the energy budget allows for additional scanning, then wireless charger discovery protocol 840 continues scanning for available wireless charger nodes in the network (1102). If the energy budget does not allow for scanning or node 102 does not need energy harvesting to satisfy its energy budget, then node 102 enters the idle state of wireless charger discovery protocol 840 (1116).

If node 102 discovers one or more available wireless charge nodes, then node 102 selects one or more of the available wireless chargers with which to pair (1106). Next, node 102 initiates pairing with and configuration of the available wireless charger node for wireless energy harvesting (1108). Node 102 determines whether a selected charger is registered (1110). If the selected wireless charger node is registered with node 102, then wireless charger discovery protocol 840 updates a list of available wireless charger nodes (1112). If the selected wireless charger node is not registered with node 102, then wireless charger discovery protocol 840 determines whether a retry count is expired (1118). If the retry count has not expired, then wireless charger discovery protocol 840 initiates charger pairing with one or more wireless charger nodes and configuration (1108). If the retry count has expired, then wireless charger discovery protocol 840 determines whether more wireless charger nodes are pending (1114). If no additional wireless charger nodes are pending, then wireless charger discovery protocol 840 enters an idle state (1116). After energy harvesting scheduler 836 updates the list of available chargers (1112), if more wireless charger nodes are pending, then wireless charger discovery protocol 840 initiates additional charger pairing and configuration (1108). If no additional wireless charger nodes are pending, then node 102 enters an idle state of wireless charger discovery protocol 840 (1116).

Referring to FIGS. 6A, 7, 8, and 10, in at least one embodiment of a network, wireless charger node 1004 sends a charger identification packet including wireless charger availability information that is received by energy harvesting node 1002 (1302). Energy harvesting node 1002 responds by sending a charger registration request to wireless charging node 1004 including proposed configuration for wireless charging node 1004 (1304). Wireless charger node 1004 responds with a charging session acknowledgement, which includes the final configuration of wireless charging node 1004, which may be different from the proposed configuration (1306). Energy harvesting node initiates a wireless charging session using the final configuration of wireless charging node 1004 (1308). In response to a packet initiating the wireless charging session, wireless charger node 1004 sends one or more wireless energy transfer packets according to the final configuration (1310, 1312, 1314). Energy harvesting node 1002 terminates the wireless charging session by sending a termination packet, e.g., after harvesting enough energy to satisfy an energy budget of harvesting node 1002, wireless communications traffic exceeds a predetermined level, or other condition (1316).

Figure 11:
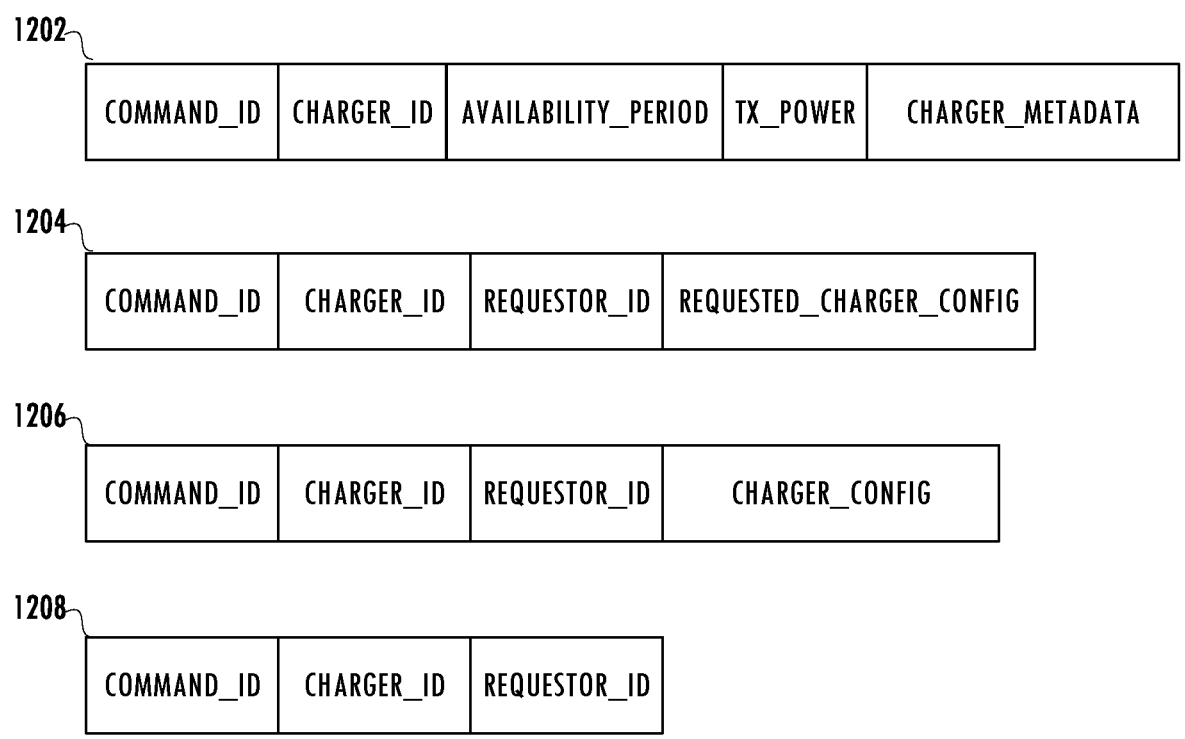
FIG. 11 illustrates exemplary packets for the wireless charger discovery protocol consistent with at least one embodiment of the invention.

In at least one embodiment, an energy harvesting node and a wireless charger node communicate charger identification packets, charger registration packets, charger registration acknowledgement packets, wireless charging session initiation/termination packets, wireless power transfer packets, or other packets to realize the energy harvesting technique. Referring to FIG. 11, in at least one embodiment, a wireless charging protocol implements charger identification packet 1202, charger registration packet 1204, charger registration acknowledgement packet 1206, wireless charging session initiation/termination packet 1208, and a NULL packet (not shown) for wireless power transfer packets.

In an embodiment, a wireless charging protocol implements charger identification packet 1202 that includes a COMMAND_ID field having a value that identifies the packet as an identification packet for a wireless charger node. A CHARGER_ID field is a unique identification code used by the network to address the wireless charger node. An AVAILABILITY_PERIOD field indicates when a node is available to serve as a wireless charger. For example, a solar powered LED lamp can be available as a wireless charger node during daytime but is unavailable during nighttime or when sunlight is not sufficiently available. In another scenario, a node intermittently switches from being a wireless charger node to being an energy harvesting node that harvests energy from another wireless charger node. In such scenarios, the availability of the node as a wireless charger node is transient and is identified by a start time and an end time. In an embodiment, to accommodate multiple configurations, the availability period is on-demand (i.e., always available as a wireless charger node), intermittently available (i.e., accompanied with the duration of availability), or periodically available (i.e., accompanied by timeslots and a fixed period of repetition). Other combinations of availability categories may be used. In an embodiment, a TX_POWER field is used by the receiver to estimate the distance of the wireless charger node, e.g., based on $p_R \propto p_T/d^2$ (free-space propagation), where $p_R$ is the received power and $p_T$ is the transmit power, and d is the distance between the transmitter and the receiver. This information can be used by the scheduler at the time of prioritizing in scenarios where multiple wireless charger nodes are available. In some embodiments, a CHARGER_METADATA field, which is optional, stores additional information about the wireless charger node (e.g., a human readable name, device information, or other information).

In an embodiment, a wireless charging protocol implements charger registration packet 1204 that includes a COMMAND_ID field having a value that identifies the packet as a registration packet for registering a node as a wireless charger node. The CHARGER_ID field is the unique identification code used by the network to identify the wireless charger node transmitting registration packet 1204. A REQUESTOR_ID field contains a unique identification code corresponding to an energy harvesting node transmitting charger registration packet 1204. This field is useful when harvesting nodes are not yet paired with wireless charger nodes. The wireless charger node adds an entry to a list of paired devices stored in a data structure of the wireless charger node. The REQUESTED_CHARGER_CONFIG field encodes a charging configuration proposed by the energy harvesting node requesting a wireless charging session. The wireless charger node that receives this request may or may not be able to satisfy the request in its entirety. The requested charger configuration includes parameters for a wireless charging session, e.g., charging frequency, transmit power (to achieve a baseline $R_x$), charging timeslots for periodic charging, or other parameters.

In an embodiment, a wireless charging protocol implements charger registration acknowledgement packet 1206 that includes a COMMAND_ID field having a value that identifies the packet as indicating that the energy harvesting node is paired with the wireless charger node and indicates acceptance by a wireless charger node of a charger configuration proposed by an energy harvesting node in a charger registration packet. This information is used by an energy harvesting scheduler to select a wireless charger node from multiple available wireless charger nodes.

In an embodiment, a wireless charging protocol implements a wireless charging session initiation/termination packet 1208 that includes COMMAND_ID field having a value that identifies the packet as initiating a wireless charging session or as terminating a wireless charging session. A CHARGER_ID field is the unique identification code used by the network to identify the wireless charger node associated with the wireless charging session. A REQUESTOR_ID field contains a unique identification code corresponding to an energy harvesting node initiating or terminating the wireless charging session. Since a wireless charger node is a shared resource, a termination packet may not actually cause a wireless charger node to terminate wireless charging, but rather to reduce the number of harvesting nodes that are relying on the wireless charger node for energy harvesting. If only one harvesting node is harvesting energy from the wireless charger node, then the termination event causes the wireless charger node to terminate wireless charging. Similarly, if at least one harvesting node is already harvesting energy from the wireless charger node, then an initiation packet does not cause the wireless charger node to begin transmitting wireless power transfer packets, but rather only increases the number of nodes depending on the wireless charger node for energy harvesting. If no neighboring nodes are harvesting energy from the wireless charger node, then an initiation event causes the wireless charger node to start transmitting wireless power transfer packets.

Energy harvesting from neighboring nodes within a network is applicable to various applications and may be implemented across one or more domains (e.g., healthcare, smart homes, industrial, or other market segments). For example, a smart home system includes multiple devices communicatively coupled with one another. Some of those devices are fixed in space (e.g., smart router, smart lighting, smart television, etc.) and other devices are mobile (i.e., battery-powered electronics, e.g., smart watch, medical implants or hearing aids). An energy harvesting system could enable a medical implant (e.g., pacemaker) to recharge during the day using wireless charging packets received from a smart router or smart lighting during the day, thereby extending the lifetime of the medical implant. In another example, a smart watch could recharge its battery from a wireless router or smart television set during the day, thereby reducing a number of times the smart watch needs to be recharged. In at least one embodiment, a solar powered LED lamp is configured as a wireless charger node and wirelessly charges nearby battery-powered devices, e.g., smart doorbell, smart doorknob, smart camera system, etc., configured as energy harvesting nodes The nearby battery-powered devices use techniques described above to discover and harvest energy from other devices to increase the lifetime of the battery-powered devices and to reduce maintenance costs for those devices installed in inaccessible locations. In at least one embodiment, a plurality of heterogeneous devices (e.g., electric meters, conveyor belts, or other machinery) in an industrial automation network are coupled to a main power supply by power lines. Battery-powered health monitor sensors, BLE-based water meters, camera systems, or other neighboring devices are configured as energy harvesting nodes that are communicatively coupled to the industrial automation network to form a cooperative energy harvesting system to reduce system downtime and maintenance costs.

Thus, techniques for harvesting energy from neighboring nodes within a wireless communications network have been described. The techniques may be implemented using software (e.g., application layer 722 or physical layer 706 of FIG. 6A) executing on a processor (which includes firmware) or by a combination of software and hardware. Software, as described herein, may be encoded in at least one tangible (i.e., non-transitory) computer readable medium. As referred to herein, a tangible computer-readable medium includes at least a magnetic, optical, or electronic storage medium.

The description of the invention set forth herein is illustrative and is not intended to limit the scope of the invention as set forth in the following claims. For example, while the invention has been described in an embodiment in which a BLE or BLE HDT communications protocol is used, one of skill in the art will appreciate that the teachings herein can be utilized with other communications protocols (e.g., an IEEE 802.15.4 based communications protocol). The terms "first," "second," "third," and so forth, as used in the claims, unless otherwise clear by context, is to distinguish between different items in the claims and does not otherwise indicate or imply any order in time, location, or quality. For example, "a first received signal," and "a second received signal," does not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A method for harvesting energy in a network of nodes, the method comprising:
 registering, by a first node of the network of nodes, a second node of the network of nodes as an available wireless charging node, by storing in a data structure of registered wireless charger nodes, an identifier of the second node and an estimate of energy to be harvested per unit time by the first node from the second node;
 selecting, by the first node, the second node from the data structure of registered wireless charger nodes, for a wireless charging session with the first node; and
 initiating the wireless charging session with the second node by the first node, the second node being configured as the wireless charger node and the first node being configured as an energy harvesting node.

2. The method as recited in claim 1, further comprising: scheduling the wireless charging session based on the estimate.

3. The method as recited in claim 2, further comprising: scheduling the wireless charging session further based on a second estimate of energy to be harvested per unit time by the first node from an additional node available to be configured as a second wireless charger node.

4. The method as recited in claim 1, further comprising: scheduling the wireless charging session based on an energy budget of the first node.

5. The method as recited in claim 1, further comprising:
 receiving by the first node a wireless energy transfer packet from the second node; and
 storing energy harvested from the wireless energy transfer packet by the first node.

6. The method as recited in claim 1, further comprising:
 transmitting, by the second node, a charger identification packet indicating availability of the second node to serve as the wireless charger node and a transmit power of the second node.

7. The method as recited in claim 1, further comprising:
 transmitting, by the first node, a charger registration request including a proposed wireless charger node configuration; and
 receiving, by the first node, a charger acknowledgement packet from the second node indicating a wireless charger node configuration in response to the charger registration request.

8. The method as recited in claim 1, wherein the second node is wireless and is intermittently available as the wireless charger node according to an energy budget of the second node.

9. The method as recited in claim 1,
 wherein the data structure includes an additional identifier of an additional node and an additional estimate of energy to be harvested per unit time by the first node from the additional node, and
 wherein the second node is selected based on the estimate and the additional estimate.

10. The method as recited in claim 3, wherein a scheduling data structure includes a charger list for each timeslot, and the scheduling data structure includes for each charger node in the charger list, a start time within an assigned timeslot, an end time within the assigned timeslot, and an estimated amount of energy to be harvested by the first node from the charger node.

11. A network of wireless nodes comprising:
 a first node comprising:
  a radio frequency transceiver configured to transmit and receive radio frequency signals; and
  data processing circuitry operable to:
   register a second node of the network of nodes as an available wireless charging node by storing in a data structure of registered wireless charger nodes an identifier of the second node and an estimate of energy to be harvested per unit time by the first node from the second node; and
   select the second node from the data structure of registered wireless charger nodes, for a wireless charging session with the first node using the radio frequency transceiver; and initiate the wireless charging session with the second node, wherein the second node is configured as the wireless charger node and the first node is configured as an energy harvesting node.

12. The network as recited in claim 11, wherein the first node further comprises:
an energy harvesting scheduler configured to schedule the wireless charging session based on the estimate of energy.

13. The network as recited in claim 11, wherein the first node further comprises:
an antenna;
an energy harvesting circuit configured to harvest energy from a wireless energy transfer packet received from the wireless charger node using the antenna and the radio frequency transceiver; and
an energy storage device to store energy harvested from the wireless energy transfer packet.

14. The network as recited in claim 11, wherein the first node further comprises:
an energy harvesting scheduler configured to schedule the wireless charging session based on an energy budget of the first node.

15. The network as recited in claim 13, wherein the wireless energy transfer packet is a NULL data packet.

16. The network as recited in claim 11, wherein the data processing circuitry comprises:
a storage element; and
a processor configured to execute instructions stored in the storage element, the instructions being executable by the processor to cause the processor to:
configure the radio frequency transceiver and the data processing circuitry to use the radio frequency transceiver to select, by the first node, the second node for the wireless charging session with the first node.

17. The network as recited in claim 11, further comprising:
a second wireless node comprising:
a second radio frequency transceiver configured to transmit and receive radio frequency signals; and
second data processing circuitry operable to:
use the second radio frequency transceiver to transmit a wireless charger node identification packet indicating availability information for the second node in response to receiving a charger identification request from the first node, and to transmit energy transfer packets in response to initiation of the wireless charging session.

18. The network as recited in claim 11,
wherein the data structure includes an additional identifier of an additional node and an additional estimate of energy to be harvested per unit time by the first node from the additional node, and
wherein the second node is selected based on the estimate and the additional estimate.

19. The network as recited in claim 12, wherein a scheduling data structure includes a charger list for each timeslot, and the scheduling data structure includes for each charger node in the charger list, a start time within an assigned timeslot, an end time within the assigned timeslot, and an estimated amount of energy to be harvested by the first node from the charger node.

\* \* \* \* \*